United States Patent [19]

Tanaka et al.

[11] 3,907,742

[45] Sept. 23, 1975

[54] SILICONE MOLDING COMPOSITIONS

[75] Inventors: Yasuhisa Tanaka; Noboru Shimamoto; Kiyoshi Yokokawa, all of Annaka, Japan

[73] Assignee: Shinetsu Chemical Company, Japan

[22] Filed: June 18, 1974

[21] Appl. No.: 480,423

[30] Foreign Application Priority Data
June 21, 1973 Japan.............................. 48-70195

[52] U.S. Cl. ............................. 260/37 SB; 260/825
[51] Int. Cl............................................ C08g 51/04
[58] Field of Search ....................... 260/37 SB, 825

[56] References Cited
UNITED STATES PATENTS
3,652,711    3/1972    Triem et al. ......................... 260/825

*Primary Examiner*—Lewis T. Jacobs
*Attorney, Agent, or Firm*—Toren, McGeady and Stanger

[57] ABSTRACT

Silicone molding compositions comprising: 100 parts by weight of a vinyl-containing block-copolymerized organopolysiloxane resin wherein the content of the vinyl groups along with the contents of the other organic groups and the residual silanolic hydroxy groups are limited within specific ranges and dimethylsiloxane units are successively linked block in linear chain or chains having specific chain length; from 200 to 400 parts by weight of a reinforcing inorganic filler; and catalytic amounts of two types of catalysts, specifically an organic peroxide and a catalyst for the condensation reaction between the residual silanolic hydroxy groups. The compositions have excellent moldability and the molded articles from them have superior physical properties.

8 Claims, No Drawings

SILICONE MOLDING COMPOSITIONS

FIELD OF THE INVENTION

This invention relates to a novel molding composition of powdery, granular or fibrous form, its resinous main component being a thermosetting silicone resin which is solid at room temperature, becoming softened at 50°C or higher and fluid at higher temperatures, with fillers and curing catalysts blended therewith. The invention in particular relates to a molding composition wherein two kinds of curing catalysts are employed in combination.

DESCRIPTION OF THE PRIOR ART

In the prior art, molding compositions wherein thermosetting resins are formulated with inorganic fillers and curing catalysts are well known. Also known are the molding compositions wherein the base resin is a silicone resin obtained by the cohydrolysis of the mixture of various kinds of organochlorosilanes. The silicone resin-based molding compositions are divided into two types in accordance with their curing mechanisms, namely those of the condensation type and those of the addition polymerization type. In the former type, the curing process is proceeded by the dehydration condensation between the silanolic hydroxy groups with the aid of the condensation catalysts such as the carboxylic acid salts of lead, iron, cobalt and zinc and several kinds of amines. The molded articles prepared from the molding compositions belonging to this type are excellent in their electric insulating properties and thermal stability, however due to the gas evolution of the condensation water produced in the step of the condensation curing, they tend to form cracks and blisters. These defects in the condensation type molding compositions are eliminated from the molding compositions of the addition polymerization type, which have the curing mechanism of the addition polymerization of the vinyl groups bonded to the silicon atoms by the catalytic action of organic peroxides. However, they have, in turn, several defects of their own, especially in their workability in the press molding.

The curing reaction in the condensation type molding compositions begins at relatively low temperature and proceeds in the course of heating the molding compositions up to the molding temperature of about 150° to 180°C, at which temperature the resin has only attained a moderate viscosity to the silicone resin from flowing out of the metal mold and segregation of the silicone resin from the filler. No substantial change in the curing reaction of the addition polymerization type molding compositions takes place until the temperature of the molding composition reaches the decomposition temperature of the organic peroxide catalyst. Therefore the viscosity of the molding composition is still too low at the molding temperature to guarantee the successful molding of the composition.

It is therefore, the object of the present invention to provide a novel silicone molding composition with excellent moldability from which the above-mentioned defects are excluded.

SUMMARY OF THE INVENTION

The molding composition of the present invention comprises homogeneously blended components of 1. 100 parts by weight of a vinyl-containing, block-copolymerized organopolysiloxane resin represented by the general formula $$\left[(CH_3)_a(C_6H_5)_b(CH_2\!=\!CH)_c SiO_{4-a-b-c/2}\right]_x$$
$$[(CH_3)_2 SiO]_{1-x}$$

where $a = 0.10$ to $0.20$, $b = 0.50$ to $0.80$, $c = 0.25$ to $0.40$, with the proviso that $(a + b + c) = 1.00$ to $1.30$, and $x = 0.60$ to $0.80$, the content of the residual silanolic hydroxy groups being from $0.3$ to $1.0$ percent by weight and the dimethylsiloxane units being in successively linked blocks in linear siloxane chain or chains having a degree of polymerization number of from 10 to 40, and preferably from 10 to 30, 2. from 200 to 400 parts by weight of an inorganic reinforcing filler, 3. a catalytic amount of an organic peroxide, and 4. a catalytic amount of a catalyst for silanol condensation.

These molding compositions are excellent in their moldability, reducing the risk of cracks in the molded articles and fins by eliminating flowing of the resin out of the metal mold as well as eliminating the possibility of rejected products due to the segregation of the resin component from the filler. These remarkable characteristics are brought about due to their unique rheological properties of moderate viscosities at the conditions of temperature and pressure of the molding process and the capability of cancelling possible strains which occur during in the molding operation.

To explain the invention in further detail, the dimethylsiloxane units involved in the component (1) of the organopolysiloxane, represented by the general formula above, must be in successively linked blocks in linear siloxane chain or chains having the repetition number of from 10 to 40, or preferably from 10 to 30. If the degree of polymerization number $n$, is smaller than 10, the resulting molding composition will not be able to cancel the strain in the molding process and if the $n$ value is larger than 40, the resulting organopolysiloxane cannot be obtained as a block copolymer in the true sense, since it will have some extent of inhomogeneity. The $x$ value in the general formula must be within the range of from 0.60 to 0.80. Larger values of $x$ than 0.80 will lead to the formation of cracks in the molded articles due to the inability of the molding compositions to cancel the strain in the molding process, while smaller values of $x$ than 0.60 will lead to insufficient hardness of the molded articles.

The c value in the general formula is selected from the range of from 0.25 to 0.40. Lower values of c than 0.25 result in insufficient hardness of the molded articles while the higher values of than 0.40 give the molded articles unsatisfactory mechanical strengths without providing advantages. The limiting values of a and b in the general formula, namely from 0.10 to 0.20 and from 0.50 and 0.80, respectively, are determined from the standpoint that the molding compositions should be in solid form at room temperature, and also from the intended thermal stability and electrical properties. If the $a$ and $b$ values are outside of those ranges, sufficient achievement of the object of the present invention cannot be expected. The content of the residual silanolic hydroxy groups in the vinyl-containing block-copolymerized organopolysiloxane as the base resin, must be within the range of from 0.3 to 1.0 percent by weight. Lower content of the hydroxy groups will result in too high a fluidity of the composition at a molding temperature of, say, 180°C, giving rise to large fins. Higher content of the hydroxy groups will result in the formation of undesirable cracks and blisters in the molded articles, as frequently occur in the molded articles made from the conventional condensation type molding compositions.

The method for the preparation of the vinyl-containing block-copolymerized organopolysiloxanes is given below. A mixture of hydrolyzable silanes, selected in accordance with the intended composition of the organopolysiloxane resin from the group consisting of $CH_3SiCl_3$, $(CH_3)_2SiCl_2$, $SiCl_4$, $C_6H_5SiCl_3$, $(C_6H_5)_2SiCl_2$, $(CH_3)(C_6H_5)SiCl_2$, $(CH_2=CH)SiCl_3$ and $(CH_3)(CH_2=CH)SiCl_2$ and their corresponding alkoxy derivatives obtained by the substitution of all or part of the chlorine atoms in the organochlorosilanes with alkoxy groups by the reaction of the chlorosilanes with alcohols such as propanol and butanol is diluted with an inert solvent such as toluene and xylene. This is then added to water and hydrolyzed to give the intermediate resin of the vinyl-containing organopolysiloxane, which is represented by the general formula

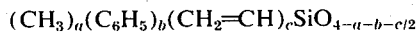

where $a = 0.10$ to $0.20$, $b = 0.50$ to $0.80$ and $c = 0.25$ to $0.40$. The content of the residual silanolic hydroxy groups in the organopolysiloxane can be adjusted within the range of from 2 to 6 percent by weight by carefully selecting the conditions of the hydrolysis.

Then, a chlorine-terminated dimethylpolysiloxane represented by the general formula

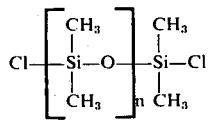

where $n$ is an integer from 10 to 40, preferably from 10 to 30, is mixed with the intermediate organopolysiloxane resin above, obtained in a proportion of from 20 to 40 percent with respect to the number of the silicon atoms contained therein based on the total number of the silicon atoms. The dehydrochlorination reaction between the hydroxy groups in the intermediate organopolysiloxane resin and the terminal chlorine atoms in the dimethylpolysiloxane takes place upon addition of a tertiary amine such as picoline and triethylamine in an amount of from 1.5 to 2.0 times the equimolar amount of the chlorine atoms. Washing with water follows to remove the amine hydrochloride, followed by filtering and distilling off of the solvent to give a solid vinyl-containing block-copolymerized organopolysiloxane resin to be formulated in the molding compositions of the present invention.

The molding compositions of the present invention are obtained by blending the vinyl-containing block-copolymerized organopolysiloxane resins thus prepared, with various reinforcing additives such as inorganic fillers and two types of catalysts, including organic peroxides and condensation catalysts. The reinforcing fillers to be employed are, fused quartz powders, diatomaceous earth, iron oxide, magnesia, titanium dioxide, glass fiber, asbestos fiber, mica powder, etc., formulated in an amount of from 200 to 400 parts by weight per 100 parts by weight of the organopolysiloxane resin. The organic peroxide catalysts can be di-cumyl peroxide, di-tertiary-butyl peroxide, benzoyl peroxide and chlorobenzoyl peroxide, formulated in a catalytic amount, for example, from 0.1 to 5 parts by weight per 100 parts by weight of the organopolysiloxane resin. Also indispensable in the molding compostions of the present invention is the addition of a catalyst for the silanolic condensation reaction, which is exemplified by amines, especially tertiary amines such as triethanolamine, triethylene diamine, imidazol, choline and dimethylphenylamine, amino group-containing organosilanes and organosiloxanes, such as γ-triaminopropyl trimethoxysilane, the salts of those amines with organic acids, and the salts of lower aliphatic carboxylic acids having 2 to 8 carbon atoms with the metals such as lead, iron, cobalt and zinc. The amount of the condensation catalyst used in the composition is considerably smaller than in the conventional condensation type molding compositions, with from 0.01 to 10 percent by weight being sufficient, based on the weight of the organopolysiloxane resin as the component (1).

Several kinds of internal mold release agents, lubricants, coloring agents, wetting agents, processing aids and other additives usually employed in the formulations of the molding compositions can also be used, as example, higher carboxylic acids and their metal salts, for example stearic acid, calcium stearate and zinc stearate, and waxes, for example carnauba wax. Several kinds of organic solvents may be added in order to improve the processability of the molding compositions in the blending step.

Example 1 illustrates the process for the preparation of the vinyl-containing block-copolymerized organopolysiloxanes to be formulated as the component (1). The other examples illustrate the blending and the molding steps of the molding compositions wherein the organopolysiloxane resins obtained in Example 1 were employed as the component (1) as well as the properties of the molded articles of respective molding compositions.

EXAMPLE 1

A mixture of organochlorosilanes composed of 129 g of $(CH_3)_2SiCl_2$, 1,058 g of $(C_6H_5)SiCl_3$, 380 g of $(C_6H_5)_2SiCl_2$ and 404 g of $(CH_2=CH)SiCl_3$ were dissolved in 2,000 g of toluene and hydrolyzed by adding the solution to an aqueous mixture of 200 g of isopropanol and 4,000 g of water. The toluene solution in the upper layer was separated from the lower aqueous layer, washed with water, dried with anhydrous sodium sulfate and distilled under reduced pressure to remove the solvent, yielding 1,200 g of an intermediate resin. The content of the residual hydroxy groups in this resin was 3.4 percent by weight and the viscosity of the 50 percent solution of the resin in toluene was 129 centistokes at 25°C. 12 g of pyridine was added to the solution of 486 g of the intermediate resin in 700 g of toluene and then 76.5 g of a dimethylpolysiloxane fluid with a polymerization degree, $n$, of 20 and having terminal chlorine atoms at both chain ends was gradually added to the toluene solution under agitation. The reaction mixture became turbid and agitation was continued for an additional hour after the completion of the adding of the dimethylpolysiloxane fluid. The reaction mixture was then repeatedly washed with water and filtered. After removal of toluene from the reaction mixture by distilling off under reduced pressure, about 540 g of a vinyl-containing block-copolymerized organopolysiloxane transparent was obtained (hereinafter called resin A).

The table below shows the values of $a$, $b$, $c$ and $x$, the content of the residual hydroxy groups, the softening temperature of the resin and values of resins B, C, D and E, which resins were prepared similarly to the preparation of resin A.

| Resin | Composition | | | | | | Hydroxy Content, wt. % | Softening Temp., °C |
|---|---|---|---|---|---|---|---|---|
| | a | b | c | x | 1−x | n | | |
| A | 0.20 | 0.80 | 0.25 | 0.80 | 0.20 | 20 | 1.0 | 60 |
| B | 0.15 | 0.30 | 0.70 | 0.30 | 15 | | 0.8 | 50 |
| C | 0.15 | 0.65 | 0.30 | 0.75 | 0.25 | 15 | 0.8 | 75 |
| D | 0.20 | 0.50 | 0.35 | 0.70 | 0.30 | 30 | 0.7 | 45 |
| E | 0.20 | 0.75 | 0.35 | 0.70 | 0.30 | 30 | 0.75 | 40 |

EXAMPLE 2

200 g of the base resin A, 120 g of Radiolite No. 900 (tradename for diatomaceous earth, by Showa Chemical Co.), 10 g of iron oxide, 400 g of glass rovings chopped in 6 mm length, 0.2 g of zinc octoate, 4 g of dicumyl peroxide, 2 g of calcium stearate and 800 g of toluene were blended together in a kneader and then subjected to a reduced pressure of 45 mmHg, at 110°C to remove toluene. After cooling, the composition was taken out in the form of chunks and granulated by crushing. The granulated composition was preheated at 120°C for 30 minutes and then press-molded in a disk shaped metal mold at 180°C for 5 minutes. Immediately after the release of the pressure, the disks were removed from the metal mold. The disks thus obtained have excellent appearance with no cracks and blisters and with very small fins. The physical properties were as follows:

| | |
|---|---|
| Flexural strength | 13.5 kg/mm² |
| Compression strength | 6.9 kg/mm² |
| Breakdown voltage | 7.4 kV/mm |

EXAMPLE 3

500 g of the vinyl-containing block-copolymerized organopolysiloxane resin B, 200 g of fused quartz powder, 20 g of titanium dioxide, 5 g of zinc stearate, 5 g of imidazol, 10 g of dicumyl peroxide and 500 g of toluene were blended in a ball mill, of 2 liters volume, for 24 hours. The white, pasty mixture thus obtained was applied to glass yarns so that the amount of the glass fiber in the finally finished molding composition was 55 percent by weight. The glass yarns impregnated with the resinous mixture were then dried to remove toluene and chopped to about 1 cm lengths. After the preheating at 120°C for 5 minutes, the molding composition thus prepared was molded, similar to Example 2, into molded articles of quite satisfactory quality.

As a control, the same composition, excluding imidazol, was pressmolded in a similar manner. The molded articles had very large fins, were difficult to remove from the metal mold and exhibited poor physical properties.

EXAMPLE 4

500 g of the vinyl-containing block-copolymerized organopolysiloxane resin C prepared in Example 1, 350 g of Celite Super Floss (diatomaceous earth, tradename by Johns-Manville Products Corp.), 4 g of triethylenediamine octoate, 6 g of dicumyl peroxide, 10 g of methyl stearate, 100 g of iron oxide and 600 g of isopropanol were blended in a ball mill for 24 hours into a pasty mixture, and used to impregnate glass yarns, in the same amount as in Example 3. The drying, chopping and the press-molding of thus obtained molding composition were also carried out similarly to in the preceding example except that the preheating of the composition was undertaken in 3 steps of 1, 2 or 3 minutes at 130°C. The molded articles had almost no fins and were satisfactory in their appearance. The physical properties of the molded articles press-molded after the preheating at 130°C for 2 minutes were as follows:

| | |
|---|---|
| Flexural strength | 14.7 kg/mm² |
| Compression strength | 7.4 kg/mm² |
| Breakdown voltage | 6.7 kV/mm |

EXAMPLE 5

100 g of the vinyl-containing block-copolymerized organopolysiloxane resin D prepared in Example 1, 200 g of Celite Super Floss, 100 g of iron oxide, 25 g of calcium stearate, 15 g of dicumyl peroxide and 0.1 g of zinc octoate were added to 600 g of isopropanol and well blended in a kneader. Asbestos was added to the mixture in an amount such that the weight of asbestos was 70 percent of the total weight of the finished molding composition. The mixture was well blended again, and then dried into chunks and crushed. After the pre-cure at 170°C for one minute, the molding composition was press-cured into disks as in Example 2. Even when taken out from the metal mold while hot, the molded articles had good appearances with no cracks, no blisters and very small fins.

EXAMPLE 6

100 g of the vinyl-containing block-copolymerized organopolysiloxane resin E prepared in Example 1, 5 g of γ-aminopropyl trimethoxysilane, 2 g of dicumyl peroxide, 350 g of mica powder were blended in a kneader with 20 g of methanol and 150 g of toluene. The mixture was dried by removing the solvents under reduced pressure at 150°C for 3 hours and then crushed. The molding composition thus prepared was press-cured at 180°C for 30 minutes after the pre-cure at 110°C for 10 minutes. The flexural strength of the molded articles was 25 kg/mm² and suffered no adverse effect from immersion in water for 48 hours.

As a control, the same test was repeated with propyl trimethoxysilane substituted for γ-aminopropyl trimethoxysilane in the above formulation and yielded the undesirable result in that the resin component in the molding composition oozed from the metal mold immediately after the application of pressure to the metal mold, thus indicating the effectiveness of the catalytic action of γ-aminopropyl trimethoxysilane in the molding composition.

EXAMPLE 7

1,000 g of the vinyl-containing block-copolymerized organopolysiloxane resin B prepared in Example 1, 500 g of fused quartz powder, 114 g of iron oxide, 2,200 g of chopped glass rovings, 20 g of dicumyl peroxide, 20 g of zinc octoate and 20 g of calcium stearate were blended in a Henshel mixer at 90° to 100°C for 30 minutes. The solid mass of the composition, after cooling was crushed into fine granular form, preheated at 120°C for 30 minutes, and cured at 175°C for 5 minutes, to give superior molded articles without cracks, blisters or fins. The physical properties of them were as follows:

| | |
|---|---|
| Flexural strength | 8.8 kg/mm² |
| Compression strength | 6.3 kg/mm² |
| Breakdown voltage | 8.6 kV/mm |

What is claimed is:
1. A silicone resin molding composition which comprises
   1. 100 parts by weight of a vinyl-containing block-copolymerized organopolysiloxane resin represented by the average formula

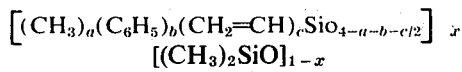
   $[(CH_3)_2SiO]_{1-x}$ where $a=0.10$ to $0.20$, $b=0.50$ to $0.80$, $c=0.25$ to $0.40$ and $x=0.60$ to $0.80$, with the proviso that $(a + b + c) = 1.00$ to $1.30$, the content of the residual silanolic hydroxy groups being from 0.3 to 1.0 percent by weight and the dimethylsiloxane units being successively linked blocks in linear siloxane chain or chains having a degree of polymerization of from 10 to 40,
   2. from 200 to 400 parts by weight of a reinforcing filler,
   3. catalytic amount of an organic peroxide, and
   4. catalytic amount of a condensation catalyst.
2. The silicone resin molding composition as claimed in claim 1, wherein said degree of polymerization is from 10 to 30.
3. The silicone resin molding composition as claimed in claim 1, wherein said reinforcing filler is selected from the group consisting of fused quartz powder, diatomaceous earth, iron oxide, magnesia, titanium dioxide, glass fiber, asbestos fiber and mica powder.
4. The silicone resin molding composition as claimed in claim 1, wherein said organic peroxide is selected from the group consisting of dicumyl peroxide, di-tertiary-butyl peroxide, benzoyl peroxide and chlorobenzoyl peroxide.
5. The silicone resin molding composition as claimed in claim 1, wherein said organic peroxide is employed in an amount of from 0.1 to 5 parts by weight per 100 parts by weight of said organopolysiloxane resin.
6. The silicone resin molding composition as claimed in claim 1, wherein said condensation catalyst is selected from the group consisting of tertiary amines, salts of said tertiary amines with organic acids, amino group containing organosilanes and organosiloxanes, and salts of lower aliphatic carboxylic acids with metals.
7. The silicone resin molding composition as claimed in claim 1, wherein said condensation catalyst is employed in an amount from 0.01 to 10 parts by weight per 100 parts by weight of said organopolysiloxane resin.
8. The silicone resin molding composition as claimed in claim 6, wherein said salts of lower aliphatic carboxylic acids with metals are selected from the salts of aliphatic carboxylic acids having from 2 to 8 carbon atoms with lead, iron, cobalt or zinc.

* * * * *